(12) United States Patent
Della Corte et al.

(10) Patent No.: US 10,348,604 B2
(45) Date of Patent: Jul. 9, 2019

(54) MONITORING A RESOURCE CONSUMPTION OF AN APPLICATION

(71) Applicant: International Business Machines Corporation, Armonk, NY (US)

(72) Inventors: Gianluca Della Corte, Rome (IT); Alessandro Donatelli, Rom (IT); Stefano Proietti, Rome (IT); Antonio M. Sgro, Rome (IT)

(73) Assignee: International Business Machines Corporation, Armonk, NY (US)

( * ) Notice: Subject to any disclaimer, the term of this patent is extended or adjusted under 35 U.S.C. 154(b) by 200 days.

(21) Appl. No.: 15/421,664

(22) Filed: Feb. 1, 2017

(65) Prior Publication Data

US 2018/0219748 A1 Aug. 2, 2018

(51) Int. Cl.
*G06F 15/173* (2006.01)
*H04L 12/26* (2006.01)

(52) U.S. Cl.
CPC ............ *H04L 43/16* (2013.01); *H04L 43/045* (2013.01); *H04L 43/067* (2013.01); *H04L 43/0817* (2013.01)

(58) Field of Classification Search
None
See application file for complete search history.

(56) References Cited

U.S. PATENT DOCUMENTS

| | | | | |
|---|---|---|---|---|
| 6,658,654 | B1 * | 12/2003 | Berry | G06F 11/3409 |
| | | | | 714/E11.192 |
| 9,369,356 | B2 | 6/2016 | Bansal et al. | |
| 2008/0168242 | A1 * | 7/2008 | Eberbach | G06F 11/004 |
| | | | | 711/161 |
| 2010/0091676 | A1 * | 4/2010 | Moran | H04L 47/10 |
| | | | | 370/252 |
| 2011/0016360 | A1 | 1/2011 | Borghetti et al. | |
| 2011/0028813 | A1 * | 2/2011 | Watson | A61B 5/726 |
| | | | | 600/324 |
| 2011/0283265 | A1 * | 11/2011 | Gagliardi | G06F 11/3495 |
| | | | | 717/130 |

(Continued)

FOREIGN PATENT DOCUMENTS

EP 2342498 8/2016

OTHER PUBLICATIONS

Siripanadorn, et al., Anomaly Detection in Wireless Sensor Networks Using Self-Organizing Map and Wavelets, ISSN: 1792-4863, URL: http://www.wseas.us/e-library/conferences/2010/Japan/ACS/ACS-59.pdf, pp. 381-387.

(Continued)

*Primary Examiner* — Phyllis A Book
(74) *Attorney, Agent, or Firm* — Schmeiser, Olsen & Watts, LLP; William Hartwell

(57) ABSTRACT

A method and system for monitoring a resource consumption of an application running on a computer. A first metric describing the resource consumption of the application as a first function of time is tracked. A wavelet analysis of the first function is performed and a discontinuity is detected in the first function at a first time at which a coefficient determined from the wavelet analysis exceeds a specified threshold. The coefficient is indexed on a dilation parameter and a time offset parameter.

17 Claims, 5 Drawing Sheets

(56) References Cited

U.S. PATENT DOCUMENTS

| | | | |
|---|---|---|---|
| 2012/0297252 A1* | 11/2012 | Borghetti | G06F 11/004 714/39 |
| 2013/0124911 A1* | 5/2013 | Griffith | H04L 45/28 714/4.2 |
| 2014/0068068 A1 | 3/2014 | Bansal et al. | |
| 2014/0359363 A1* | 12/2014 | Biem | G06F 11/3024 714/37 |
| 2015/0089270 A1* | 3/2015 | Jeong | G06F 21/31 714/3 |
| 2015/0229661 A1 | 8/2015 | Balabine et al. | |
| 2015/0234816 A1 | 8/2015 | Chong et al. | |
| 2015/0333964 A1* | 11/2015 | Wang | G06F 1/3203 709/224 |
| 2016/0164721 A1 | 6/2016 | Zhang et al. | |
| 2016/0217022 A1 | 7/2016 | Velipasaoglu et al. | |
| 2016/0226737 A1 | 8/2016 | Boubez | |
| 2017/0245768 A1* | 8/2017 | White | G06K 9/00496 |
| 2017/0257303 A1* | 9/2017 | Boyapalle | H04L 67/34 |

OTHER PUBLICATIONS

Lu et al., Network Anomaly Detection Based on Wavelet Analysis, URL: http://dl.acm.org/citation.cfm?id=1513555, Hindawi Publishing Corporation, EURASIP Journal on Advances in Signal Processing, vol. 2009, Article ID 837601, 16 pages.

Mahimkar et al., Rapid Detection of Maintenance Induced Changes in Service Performance, URL:http://dl.acm.org/citation.cfm?id=2079309, ACM CoNEXT 2011, Dec. 6-9, 2011, ACM 978-1-4503-1041-3/11/0012, 12 pages.

Wang et al., Online Detection of Utility Cloud Anomalies Using Metric Distributions, URL: http://ieeexplore.ieee.org/document/5488443/, 978-1-4244-5367-2/10, pp. 96-103.

Setz et al., Wavelet Analysis on Stochastic Time Series, A visual introduction with an examination of long term financial time series, 63 pages, ETH Zurich, Computational Science and Engineering Semester Thesis Winter 2011.

* cited by examiner

MONITORING A RESOURCE CONSUMPTION OF AN APPLICATION

TECHNICAL FIELD

The present invention relates in general to data processing systems, and in particular, to a data processing system for monitoring a resource consumption of an application running on a computer.

BACKGROUND

In the computer cloud world, applications may be distributed over several machines, making the topology of the machines that provide the service more difficult to track and monitor. Monitoring an application provides insight about application performances, bottlenecks, etc. While the application is distributed over several machines, in order to track the performance of the application, it is desirable to collect a huge amount of data that will impact both application performance and monitoring server performance in terms of resource usage (disk, memory, CPU).

SUMMARY

A method, and associated data processing system and computer program product, for monitoring a resource consumption of an application running on a computer. One or more processors of a data processing system track a first metric describing the resource consumption of the application as a first function of time. The one or more processors perform a wavelet analysis of the first function and detect a discontinuity in the first function at a first time at which a coefficient determined from the wavelet analysis exceeds a specified threshold. The coefficient is indexed on a dilation parameter and a time offset parameter.

BRIEF DESCRIPTION OF THE DRAWINGS

The present invention together with the above-mentioned and other objects and advantages may best be understood from the following detailed description of the embodiments, but not restricted to the embodiments.

DETAILED DESCRIPTION

Figure 1:
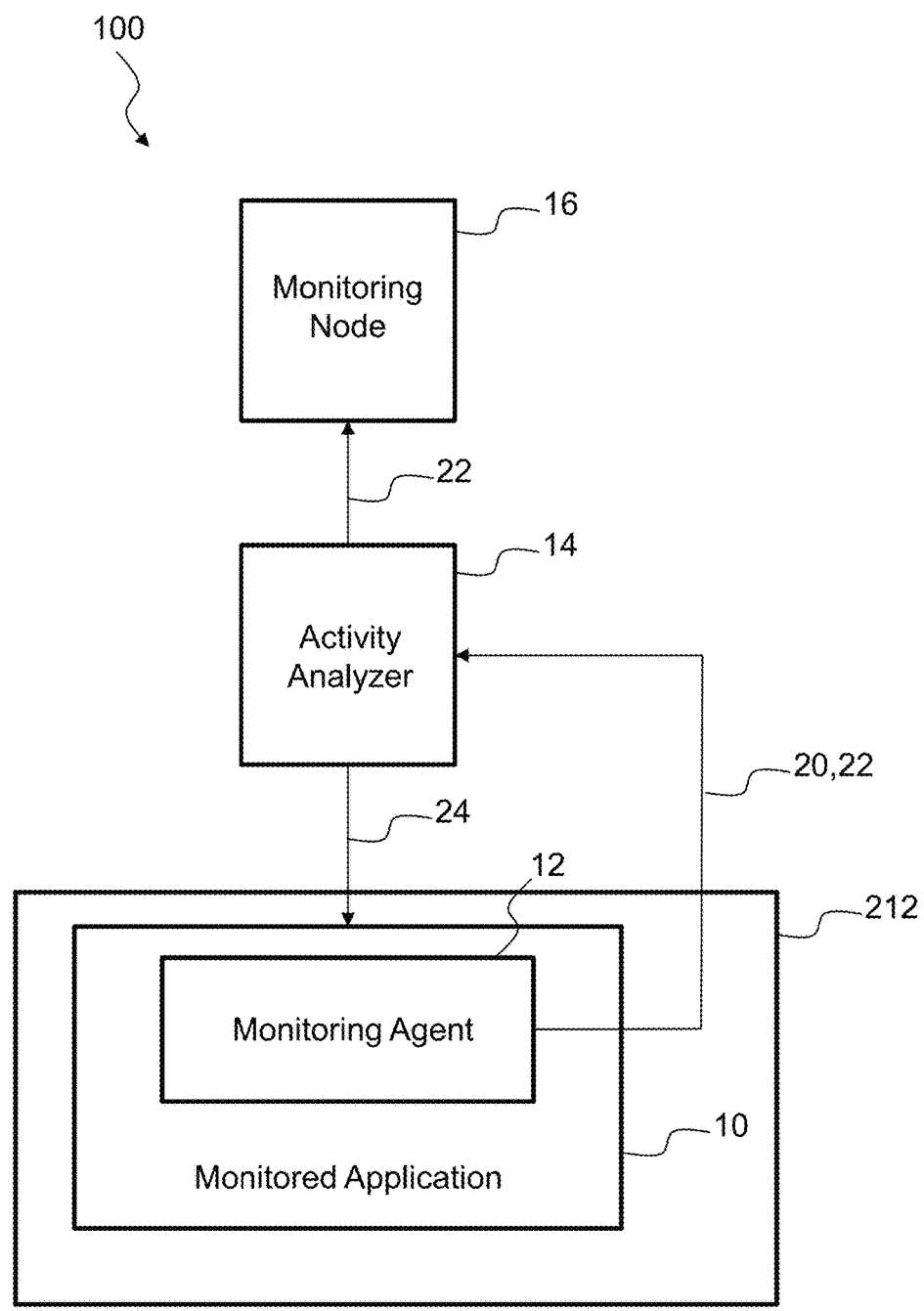
FIG. 1 depicts a block diagram of a system for monitoring a resource consumption of an application running on a computer, in accordance with embodiments of the present invention.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments provide a system for monitoring a resource consumption of an application running on a computer.

The system comprises (i) a monitoring agent associated with the application and is operable for tracking at least one metric describing the resource consumption of the application. Further the system comprises (ii) an activity analyzer being operable for receiving values of the metric from the monitoring agent and performing a wavelet analysis of the values and for detecting a discontinuity in a development of the metric over time based on the wavelet analysis.

The illustrative embodiments provide a method for monitoring a resource consumption of an application running on a computer. The method comprises (i) tracking at least one metric describing the resource consumption of the application by a monitoring agent associated with the application; and (ii) performing a wavelet analysis of the values and detecting a discontinuity in a development of the metric over time based on the wavelet analysis by an activity analyzer being operable for receiving values of the metric from the monitoring agent.

There is a need in the new cloud distributed applications to efficiently collect and track application performances without impacting the application performances and the monitoring server as well.

The inventive system and method introduces a mechanism able to recognize signal perturbation in order to identify a possible anomaly within an application behavior, which enables changing the level of diagnostic data collection to help trouble shooting the issue.

The inventive system and method are based on a wavelet analysis of an application signal that allows identification of a discontinuity of the signal itself in order to decide whether or not to increase the data collection monitoring level.

Embodiments of the present invention provide a computer program product for monitoring a resource consumption of an application running on a computer, the computer program product comprising a computer readable hardware storage medium or device having program instructions embodied therewith, the program instructions executable by the computer to cause the computer to perform a method comprising, (i) tracking at least one metric describing the resource consumption of the application by a monitoring agent associated with the application; and (ii) performing a wavelet analysis of the values and detecting a discontinuity in a development of the metric over time based on the wavelet analysis by an activity analyzer being operable for receiving values of the metric from the monitoring agent.

Embodiments of the present invention provide a data processing system for execution of a data processing program, comprising computer readable program instructions for performing embodiments of the method of the present invention.

The illustrative embodiments are sometimes described herein using particular technologies only as an example for the clarity of the description. The illustrative embodiments may be used for a system for monitoring a resource consumption of an application running on a computer, the system comprising (i) a monitoring agent associated with the application and being operable for tracking at least one metric describing the resource consumption of the application; and (ii) an activity analyzer being operable for receiving values of the metric from the monitoring agent and performing a wavelet analysis of the values and for detecting a discontinuity in a development of the metric over time based on the wavelet analysis.

The inventive system and method is based on the following components and flow: there is a predictive analyzer engine between a monitoring agent as a data collector and a monitoring server or node. The predictive analyzer engine captures all the data coming from a client application to the server and in a normal behavior forwards the data to the server. When the analyzer engine identifies a discontinuity in the monitoring signal, the analyzer engine triggers an event to the monitoring agent to change the level of diagnostic data collection for that specific monitoring signal.

The predictive analyzer engine identifies the discontinuity applying a wavelet analysis to all real time monitoring signals transmitted by the monitoring agent to the server.

A presence of a discontinuity in the signal is evidence that something is changing and that it could be desirable to collect more diagnostic data until the trend will be back to the normal trend.

An advantage of the current disclosure compared to prior art is that embodiments of the invention provide more efficacy in highlighting small perturbations in a signal which are not visible using the standard predictive analysis techniques.

According to the inventive system and method, wavelet spectral analysis is used to identify the discontinuities in a metrics trend that normally are not visible. Wavelet spectral analysis is analogous to conventional spectral analysis but uses the wavelet transform rather than the Fourier transform. Because wavelets yield frequency and time information simultaneously, the wavelet power spectrum varies over time and across frequencies. Wavelet spectral analysis thus measures the variance distribution of a time series in the time-frequency space. Changes in periodicity over time may be recorded in the wavelet power spectrum. Thus, it is possible to capture irregular cycles and identify time periods of different predominant cycles in the time series.

Embodiments of the present invention exhibit a significant advantage compared to state of the art. Conventionally, the power spectrum is estimated using the Fourier transform. Using the wavelet transform in conjunction with embodiments of the present invention, spectral analysis is able to detect transient and irregular cycles and structural breaks in the periodicity of those cycles, even if the time series is not stationary, such as for monitoring data.

In order to make the spectral analysis more efficient the Discrete Wavelet Transform (DWT) may be used for monitoring a resource consumption of an application running on a computer, instead of the Continuous Wavelet Transform (CWT), which might also be used.

The Discrete Wavelet Transform (DWT) is similar to the Fourier transform in that the DWT is a decomposition of a signal in terms of a set of basis functions. For Fourier transforms the set consists of sines and cosines and the expansion has a single parameter. In wavelet transform the expansion has two parameters and the functions (wavelets) are generated from a single "mother" wavelet using dilation and offsets corresponding to the two parameters.

$$f(t) = \sum_a \sum_b c_{ab} \psi_{ab}(t) \quad (1)$$

where $f(t)$ is the wavelet transform as a function of time t, the two-parameter expansion coefficients $c_{ab}$ are given by $$c_{ab} = \int f(t) \psi_{ab}(t) dt \quad (2)$$

and the wavelets $\psi_{ab}(t)$ obey the condition $$\psi_{ab}(t) = 2^{\frac{a}{2}} \psi_{ab}(2^a t - b) \quad (3)$$

Here $\psi$ is the mother wavelet, a is the dilation parameter (i.e., scale factor) and b is the time offset parameter (i.e., time translation factor).

In time series analysis, using the discrete wavelet transform, the maximum wavelet level is limited by the number of time points, N. For the DWT, $J_0$ (the maximum number of levels), cannot be greater than j, where N=2j.

The exact choice of $J_0$ will depend on the application. $J_0$ may be defined conservatively as maximum $J_0 <= \log_2 (0.5*N)$.

The squared magnitude of the DWT $S=|f(a, b)|^2$ is equivalent to the power spectrum so that a typical display (image) of the DWT is a representation of the power spectrum as a function of time offset b.

Normalizing the power spectrum, it is possible to define a general threshold for all signals that can be used to identify possible discontinuities in the signal data. The values of the dilation parameter a and the time offset parameter b at which coefficients $c_{ab}$ exceeds the threshold identify times or time ranges at which discontinuities are present in the signal data. Specifically in accordance with DWT, discontinuities localized in time as identified by the time offset parameter b may occur at high frequencies associated with low values of the dilation parameter a.

Advantageously, 3.0 may be defined as threshold to identify discontinuities.

According to embodiments of the invention this approach may be applied to metric signals to identify discontinuities.

If multiple discontinuities are detected at the same time in different metric signals, a cross-correlation may be calculated to define, which is the action to be taken in terms of deeper diagnostic data collection, wherein the thresholds are associated with different values of the cross correlation index.

In signal processing, cross-correlation is a measure of similarity of two series as a function of the lag of one relative to the other. For two discrete functions $f$, g, the cross-correlation $(f*g)[n]$ at a discrete time n is defined in equation (4) and has values between −1 and 1:

$$(f*g)[n] \equiv \sum_{m=-\infty}^{\infty} f^*[m]g[m+n] \quad (4)$$

where n, m are discrete time indices and $f^*$ is the complex conjugate function of $f$.

According to the inventive system and method the predictive activity analyzer engine makes a streaming of the resource monitoring metrics collected by data collectors, such as the monitoring agent. Metrics are organized in a database repository grouped by logical applications. Only applications under usage are considered. The metrics may be stored for a configurable period (e.g., 24 hours).

The activity analyzer executes the wavelet transformation against the stored metrics. As described above the wavelet transformation advantageously may be used instead of standard Fourier transformation, because the wavelet transformation performs better for non-stationary and non-smooth time series, such as performance data on a computer, permitting at the same time to keep information over time.

The classical Fourier transform of a function $f$ allows making a measurement with zero bandwidth: the evaluation $f(k)$ tells precisely the size of a component of frequency k. But by doing so, all control on spatial duration is lost: it is not known when in time the signal happened, which is the limiting case of the uncertainty principle: absolute precision on frequency and zero control on temporal spread.

The wavelet transform takes advantage of the intermediate cases of the uncertainty principle. Each wavelet measurement, which is the wavelet transform corresponding to a fixed parameter, delivers information about the temporal extent of the signal, as well as about the frequency spectrum of the signal. From a parameter w, which is the analogue of the frequency parameter k for the Fourier transform, a characteristic frequency k(w) and a characteristic time t(w) may be derived. Thus it may be derived that the initial function includes a signal of an approximate frequency k(w) that happened at an approximate time t(w). Thus, calculating a wavelet power spectrum of such time series enables identification of discontinuities in the metrics data.

If a discontinuity is detected, the activity analyzer performs the wavelet cross-correlation analysis on all metrics associated to the logical application. The cross-correlation function identifies patterns where multiple anomalies at the same time are discovered in different signals, driving the activity analyzer to submit a request for deeper diagnostic data collection.

The following diagram in FIG. 1 describes the components of an embodiment of the invention and the data flow between the components.

Figure 3:
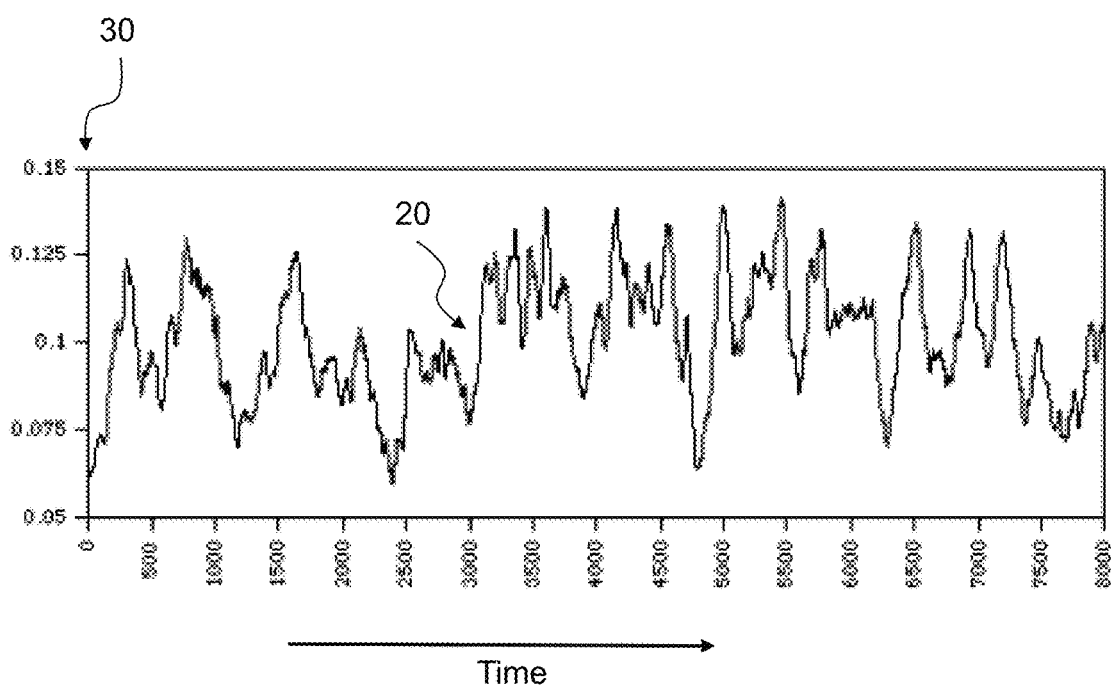
FIGS. 3 and 4 depict respective metrics of an application running on a computer as time series data, in accordance with embodiments of the present invention.
Figure 4:
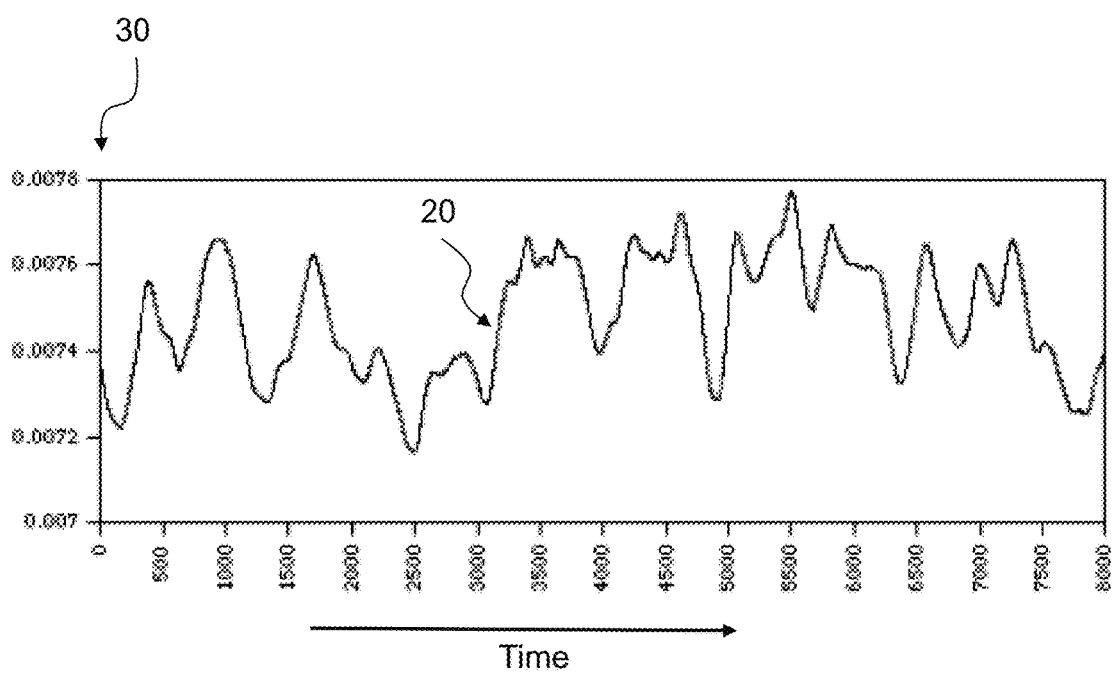

FIG. 1 depicts a block diagram of a system 100 for monitoring a resource consumption of an application 10 running on a computer 212, in accordance with embodiments of the present invention. The system 100 comprises the application 10 running on the computer 212, and a monitoring agent 12 associated with the application 10. The monitoring agent 12 is tracking at least one metric 30 describing the resource consumption of the application 10. Examples of a metric 30 are shown in FIGS. 3 and 4. Further the system 100 comprises the activity analyzer 14. The activity analyzer 14 receives values of the metric 30 from the monitoring agent 12 and performs a wavelet analysis of the values, thus being able to detect a discontinuity 32 (see FIG. 5) in a development of the metric 30 (see FIGS. 3 and 4) over time based on the wavelet analysis.

The monitoring agent 12 thus may generate a diagnosis report 22 from diagnosis data 20 and may forward the diagnosis report 22 to a monitoring node 16 or a monitoring server. The diagnosis report 22 comprises diagnosis data 20 related to the application 10 according to a predefined diagnostic level 24. According to the diagnoses report 22 the activity analyzer 14 may adjust the diagnostic level 24 in response to detecting the discontinuity 32.

The activity analyser 14 and/or the monitoring node 16 may reside on the same computer 212 as the application 10, but might alternatively reside on other processors of a data processing system.

The system 100 may be configured such that the activity analyzer 14 receives multiple metrics 30 from the monitoring agent 12 for calculating a cross-correlation 26 of the metrics 30 (shown e.g. in FIG. 5) or the wavelet transform thereof and adjusts the diagnostic level 24 based on the calculated cross-correlation 26. As described above, the discontinuity 32 may be characterized by at least one characteristic frequency and at least one characteristic time or at least one characteristic time period in a time series.

The metric 30 may advantageously characterize at least one of: processor utilization, main memory usage, mass storage occupancy, or mass storage I/O throughput. Adjusting the diagnostic level 24 by the activity analyser 14 may advantageously comprise start of a debugging function on the application 10 in order to be able to isolate and/or identify a failure in the system.

Figure 2:
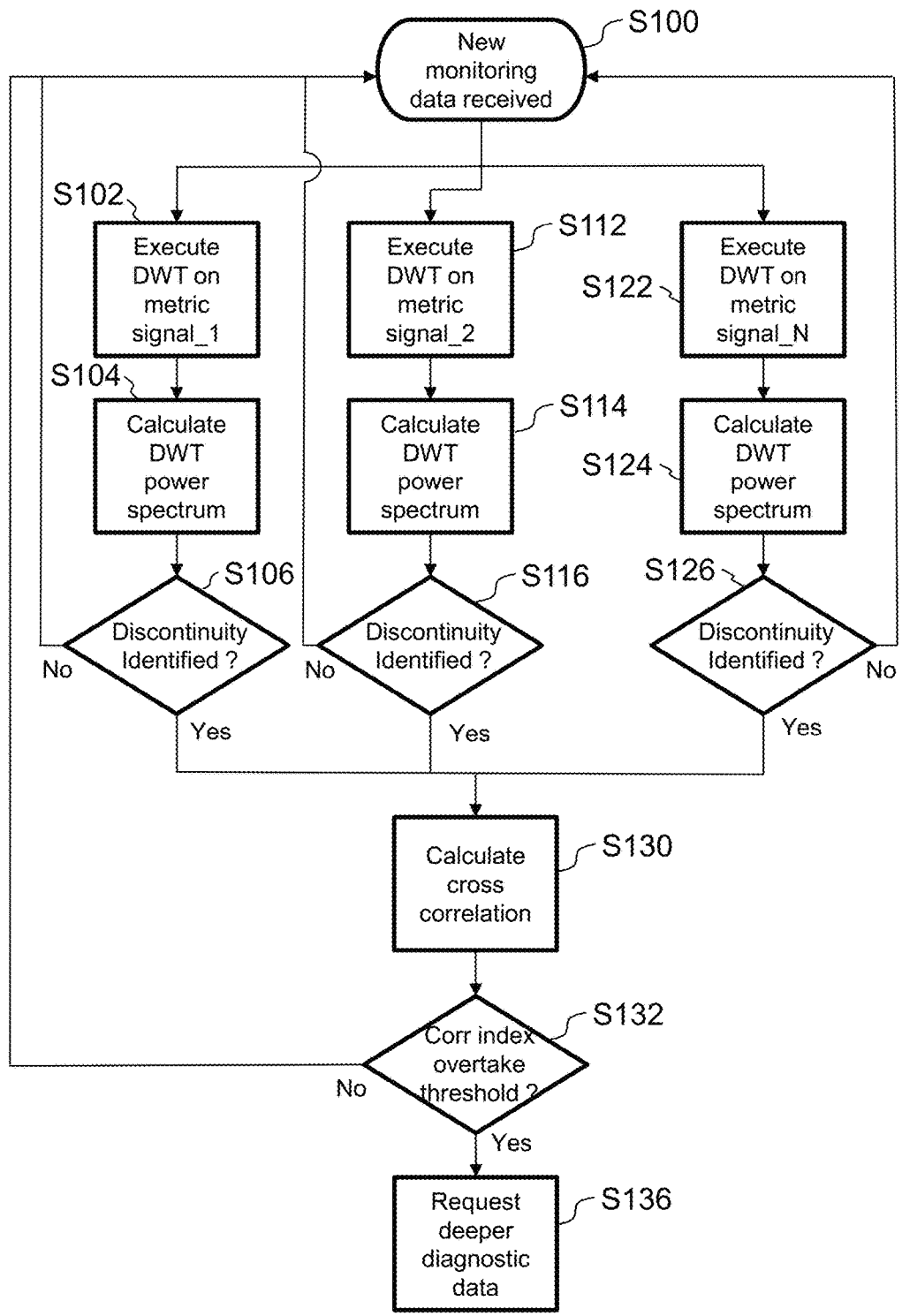
FIG. 2 depicts a flowchart of a method for monitoring a resource consumption of an application running on a computer, in accordance with embodiments of the present invention.

FIG. 2 depicts a flowchart of a method for monitoring a resource consumption of the application 10 running on the computer 212, in accordance with embodiments of the present invention. As already described with the system 100 in FIG. 1, the method comprises (i) tracking at least one metric 30 describing the resource consumption of the application 10 by a monitoring agent 12 associated with the application 10; and (ii) performing a wavelet analysis of the values and detecting a discontinuity 32 in a development of the metric 30 over time based on the wavelet analysis by an activity analyzer 14 being operable for receiving values of the metric 30 from the monitoring agent 12. The method may further comprise (iii) generating a diagnosis report 22, the diagnosis report 22 comprising diagnosis data 20 related to the application 10 according to a diagnostic level 24 by the monitoring agent 12; (iv) forwarding the diagnosis report 22 to a monitoring node 16 by the monitoring agent 12; and (v) adjusting the diagnostic level 24 in response to detecting the discontinuity 32 by the activity analyzer 14.

The flowchart of FIG. 2 describes the flow on how the wavelet transformation may be used against metric signals to decide if deeper diagnostic data are requested.

In response to new monitoring data received by the monitoring agent 12 in step S100, discrete wavelet transforms may be calculated in parallel or consecutively on the different monitored metric signals 1 to N, as marked in steps S102, S112, S122, followed by calculating power spectra in steps S104, S114, S124. If no discontinuities are identified in steps S106, S116, S126, the monitoring process is continued in step S100. If discontinuities are identified, across-correlation function for the different monitored metrics are calculated in step S130.

Depending on the determined cross-correlation index, which may be the function value of the cross-correlation function at a given time or time interval, deeper diagnostic data are requested in step S136, otherwise control is given back to the monitoring process in step S100. Thus a diagnostic level may be changed according to the determined cross-correlation index.

Figure 5:
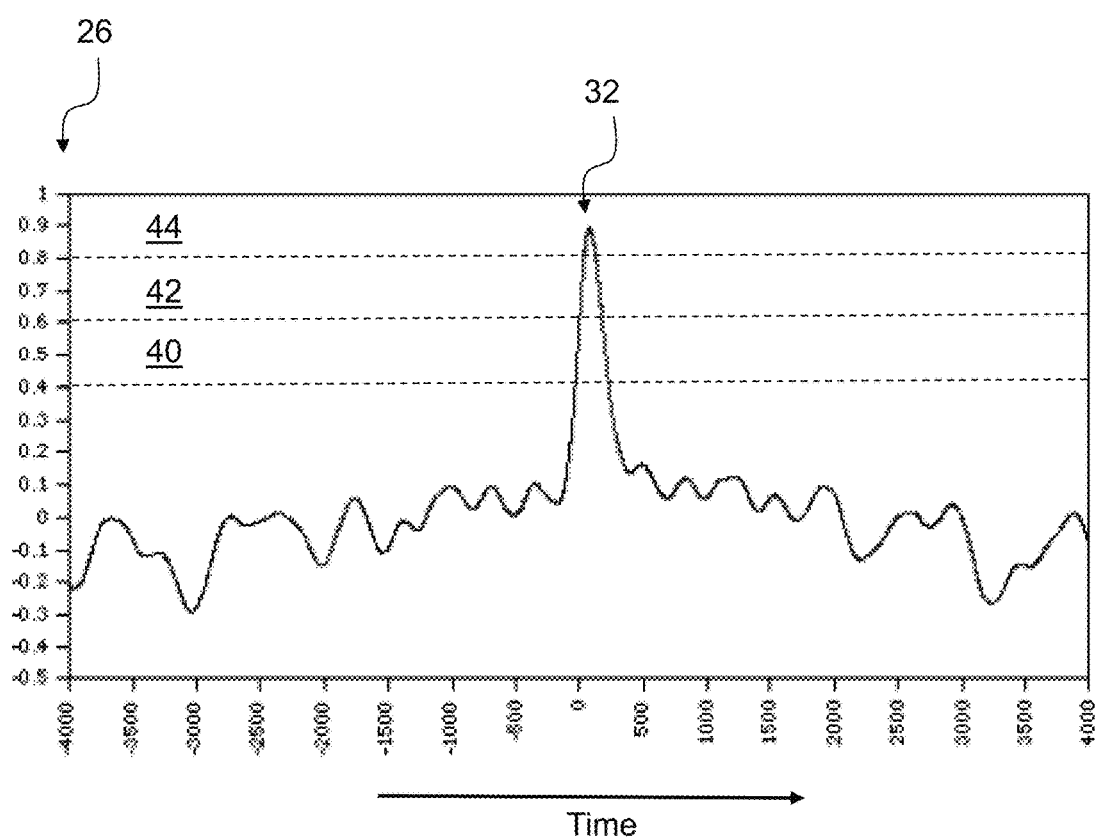
FIG. 5 depicts a cross-correlation function of power spectra calculated with a wavelet transformation from the metrics in FIGS. 3 and 4, in accordance with embodiments of the present invention.

For example, deeper diagnostic data 20 may comprise resource consumption information, such as values of the metric 30 over time, if the diagnostic level 24 (indicated in FIG. 1) is within a first range 40 (see FIG. 5). Further, diagnosis data 20 may comprise a method trace of a thread executed by the application 10, if the diagnostic level 24 is within a second range 42 (see FIG. 5). And diagnosis data 20 may further comprise a stack trace of a thread executed by the application 10, if the diagnostic level 24 is within a third range 44 (see FIG. 5).

Examples for different ranges of the diagnostic level 24 are marked in FIG. 5.

FIGS. 3 and 4 depict respective metrics of the application 10 running on the computer 212 as time series data, in accordance with embodiments of the present invention. The time series data are depicted as an example for the described method for analysing diagnosis data, such as, e.g., CPU usage data over time, collected by a monitoring agent 12. Diagnosis data 20 as a function of time are shown as an example of a monitored metric 30. The scales exhibit arbitrary values.

According to the inventive method, input means such as a monitoring agent 12 are receiving signal time series data 20 from a data provider monitoring a specific application 10 or middleware. The input signal is transformed using a wavelet transformation. The output of the wavelet transformation enables to identify discontinuities in the diagnosis data 20. The power spectra of multiple metrics, such as the diagnosis data in FIGS. 3 and 4, may be cross-correlated to identify patterns where multiple anomalies at the same time are discovered in different signals.

A result from determining a cross-correlation function 26 of power spectra calculated with a wavelet transformation from the metrics 30 in FIGS. 3 and 4 is shown in FIG. 5.

FIG. 5 depicts a cross-correlation function of power spectra calculated with a wavelet transformation from the metrics in FIGS. 3 and 4, in accordance with embodiments of the present invention. Function values as a cross-correlation index in FIG. 5 are shown in a range between −0.5 and 1.0.

By defining a set of debugging thresholds associated with different values of the cross correlation index, it is possible to drive the activity analyzer 14 to submit a request for deeper diagnosis data collection, based on the cross correlation index.

Ranges 40, 42, 44 of the cross-correlation index for different diagnostic levels are marked in the scale of the diagram. The first range 40 lies between a cross-correlation index of 0.4 and 0.6, the second range 42 between 0.6 and 0.8 and the third range 44 above 0.8.

For example, deeper diagnostic data 20 may comprise resource consumption information, preferably values of the metric 30 over time, if the diagnostic level 24 (indicated in FIG. 1) is within the first range 40. Further, diagnosis data 20 may comprise a method trace of a thread executed by the application 10, if the diagnostic level 24 is within the second range 42. And diagnosis data 20 may further comprise a stack trace of a thread executed by the application 10, if the diagnostic level 24 is within the third range 44.

Over most of the time interval shown, the cross-correlation index lies in a range between −0.3 and 0.1, except for a discontinuity 32, where the cross-correlation index increases up to a value of 0.9. This phenomenon is a clear indication that there is an anomaly in the original diagnosis data which might need some deeper diagnostic insight. The discontinuity 32 rises up to the range 44, driving the activity analyser 14 to adjust the diagnostic level to a third level.

Figure 6:
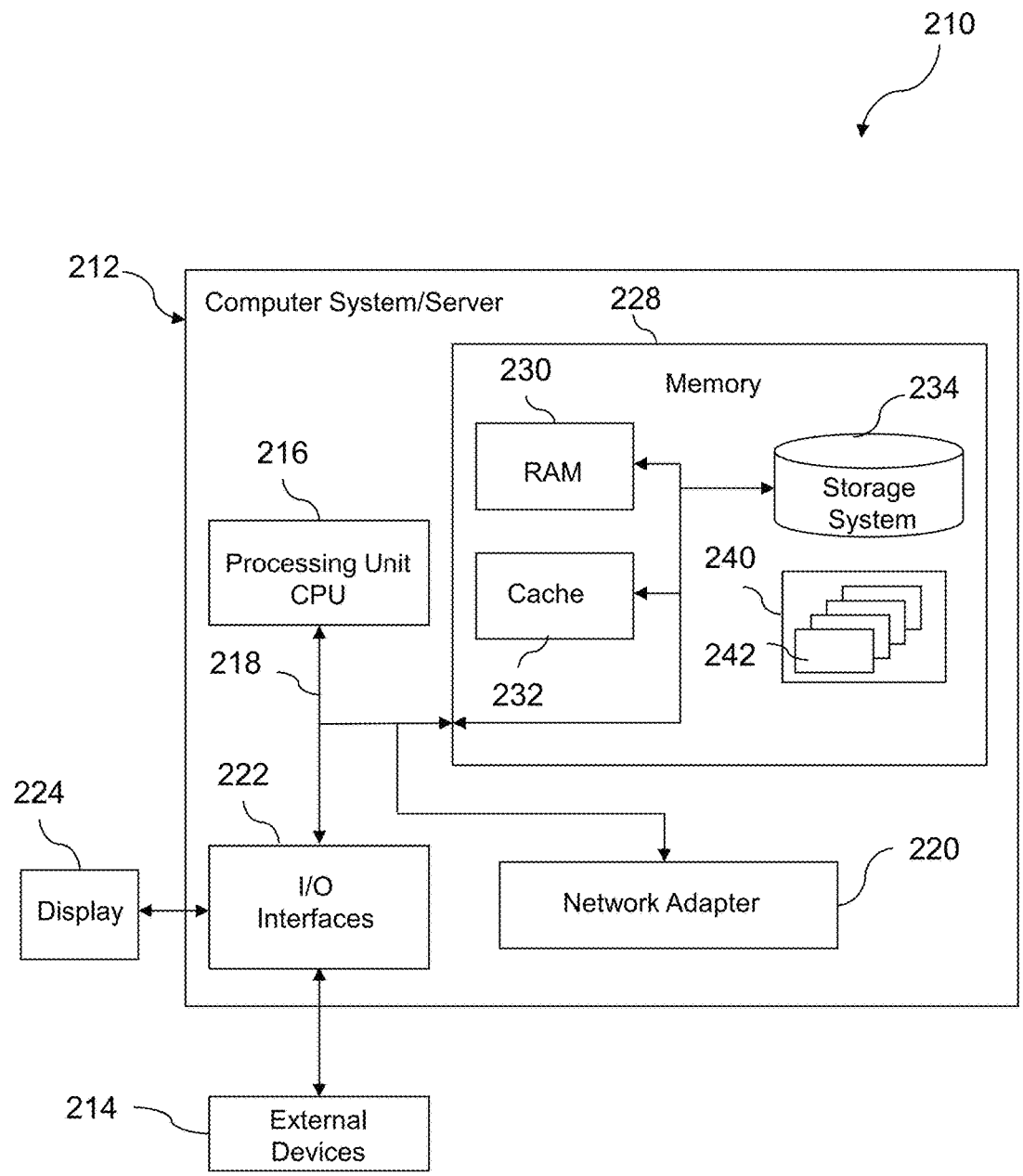
FIG. 6 depicts an example embodiment of a data processing system for executing a method, in accordance with embodiments of the present invention.

FIG. 6 depicts an example embodiment of a data processing system 210 for executing a method, in accordance with embodiments of the present invention. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above. In one embodiment, the data processing system 210 comprises, or is, the system 100 of FIG. 1.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

A computer program product of the present invention may include one or more computer readable hardware storage devices having computer readable program code stored therein, said program code containing instructions executable by one or more processors of a data processing system (or computer system) to implement the methods of the present invention.

A data processing system (or computer system) of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for monitoring a resource consumption of an application running on a computer, said method comprising:
   tracking, by one or more processors of a data processing system, a first metric describing the resource consumption of the application as a first function of time;
   performing, by the one or more processors, a wavelet analysis of the first function and detecting, by the one or more processors, a discontinuity in the first function at a first time at which a coefficient determined from the wavelet analysis exceeds a specified threshold, said coefficient being indexed on a dilation parameter and a time offset parameter;
   tracking, by the one or more processors, a second metric describing the resource consumption of the application as a second function of time;
   calculating, by the one or more processors, a cross-correlation of the first metric and the second metric;
   adjusting, by one or more processors, a diagnostic level associated with the discontinuity in the first function, said adjusting based on the calculated cross-correlation; and
   in response to adjusting the diagnostic level, starting, by the one or more processors, a debugging function on the application in response to the cross correlation having a value indicative of an anomaly within the application.

2. The method of claim 1, said method further comprising:
   generating, by the one or more processors utilizing a result from said debugging, a diagnosis report, wherein the diagnosis report comprises diagnosis data related to the application according to the diagnostic level, and wherein the adjusted diagnosis data relates to the anomaly within the application;
   forwarding, by the one or more processors, the diagnosis report to a monitoring node in the data processing system.

3. The method of claim 2, wherein the diagnosis data comprises resource consumption information, in response to a determination that the diagnostic level is within a previously specified first range.

4. The method of claim 2, wherein the diagnosis data comprises a method trace of a thread executed by the application in response to a determination that the diagnostic level is within a previously specified second range.

5. The method of claim 2, wherein the diagnosis data comprises a stack trace of a thread executed by the application in response to a determination that the diagnostic level is within a previously specified third range.

6. The method of claim 1, wherein the first metric or the second metric is processor utilization, main memory usage, mass storage occupancy, or mass storage I/O throughput.

7. The method of claim 1, wherein the discontinuity is characterized by (i) at least one characteristic frequency and (ii) at least one characteristic time or at least one characteristic time period in a time series.

8. A computer program product, comprising one or more computer readable hardware storage devices having computer readable program code stored therein, said program code containing instructions executable by one or more processors of a data processing system to implement a method for monitoring a resource consumption of an application running on a computer, said method comprising:
   tracking, by the one or more processors of the data processing system, a first metric describing the resource consumption of the application as a first function of time;
   performing, by the one or more processors, a wavelet analysis of the first function and detecting, by the one or more processors, a discontinuity in the first function at a first time at which a coefficient determined from the wavelet analysis exceeds a specified threshold, said coefficient being indexed on a dilation parameter and a time offset parameter;
   tracking, by the one or more processors, a second metric describing the resource consumption of the application as a second function of time;
   calculating, by the one or more processors, a cross-correlation of the first metric and the second metric;
   adjusting, by one or more processors, a diagnostic level associated with the discontinuity in the first function, said adjusting based on the calculated cross-correlation; and
   in response to adjusting the diagnostic level, starting, by the one or more processors, a debugging function on the application in response to the cross correlation having a value indicative of an anomaly within the application.

9. The computer program product of claim 8, said method further comprising:
generating, by the one or more processors utilizing a result from said debugging, a diagnosis report, wherein the diagnosis report comprises diagnosis data related to the application according to the diagnostic level, and wherein the adjusted diagnosis data relates to the anomaly within the application;
forwarding, by the one or more processors, the diagnosis report to a monitoring node in the data processing system.

10. The computer program product of claim 9, wherein the diagnosis data comprises resource consumption information, in response to a determination that the diagnostic level is within a previously specified first range.

11. The computer program product of claim 9, wherein the diagnosis data comprises a method trace of a thread executed by the application in response to a determination that the diagnostic level is within a previously specified second range.

12. The computer program product of claim 9, wherein the diagnosis data comprises a stack trace of a thread executed by the application in response to a determination that the diagnostic level is within a previously specified third range.

13. A data processing system, comprising one or more processors, one or more memories, and one or more computer readable hardware storage devices, said one or more hardware storage device containing program code executable by the one or more processors via the one or more memories to implement a method for monitoring a resource consumption of an application running on a computer, said method comprising:
tracking, by the one or more processors of the data processing system, a first metric describing the resource consumption of the application as a first function of time;
performing, by the one or more processors, a wavelet analysis of the first function and detecting, by the one or more processors, a discontinuity in the first function at a first time at which a coefficient determined from the wavelet analysis exceeds a specified threshold, said coefficient being indexed on a dilation parameter and a time offset parameter;
tracking, by the one or more processors, a second metric describing the resource consumption of the application as a second function of time;
calculating, by the one or more processors, a cross-correlation of the first metric and the second metric;
adjusting, by one or more processors, a diagnostic level associated with the discontinuity in the first function, said adjusting based on the calculated cross-correlation; and
in response to adjusting the diagnostic level, starting, by the one or more processors, a debugging function on the application in response to the cross correlation having a value indicative of an anomaly within the application.

14. The data processing system of claim 13, said method further comprising:
generating, by the one or more processors utilizing a result from said debugging, a diagnosis report, wherein the diagnosis report comprises diagnosis data related to the application according to the diagnostic level, and wherein the adjusted diagnosis data relates to the anomaly within the application;
forwarding, by the one or more processors, the diagnosis report to a monitoring node in the data processing system.

15. The data processing system of claim 14, wherein the diagnosis data comprises resource consumption information, in response to a determination that the diagnostic level is within a previously specified first range.

16. The data processing system of claim 14, wherein the diagnosis data comprises a method trace of a thread executed by the application in response to a determination that the diagnostic level is within a previously specified second range.

17. The data processing system of claim 14, wherein the diagnosis data comprises a stack trace of a thread executed by the application in response to a determination that the diagnostic level is within a previously specified third range.

* * * * *